J. J. PHILLIPS.
ELECTRIC WINDING MECHANISM FOR SPRING MOTORS.
APPLICATION FILED JUNE 2, 1917.
1,365,724.
Patented Jan. 18, 1921.
2 SHEETS—SHEET 1.
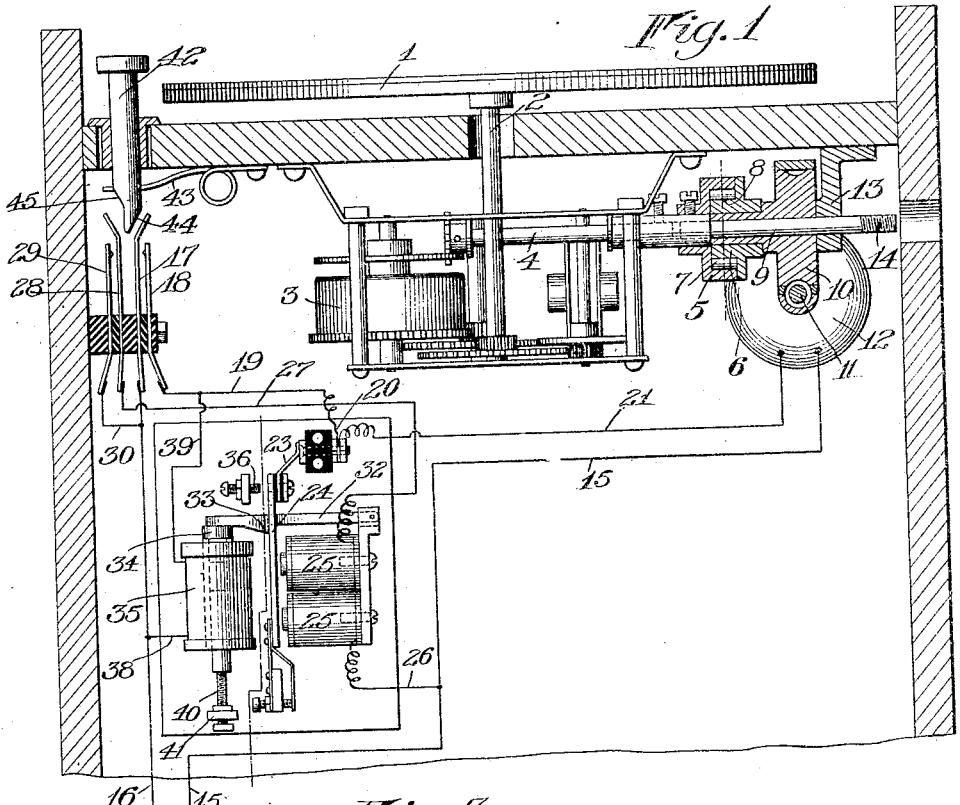
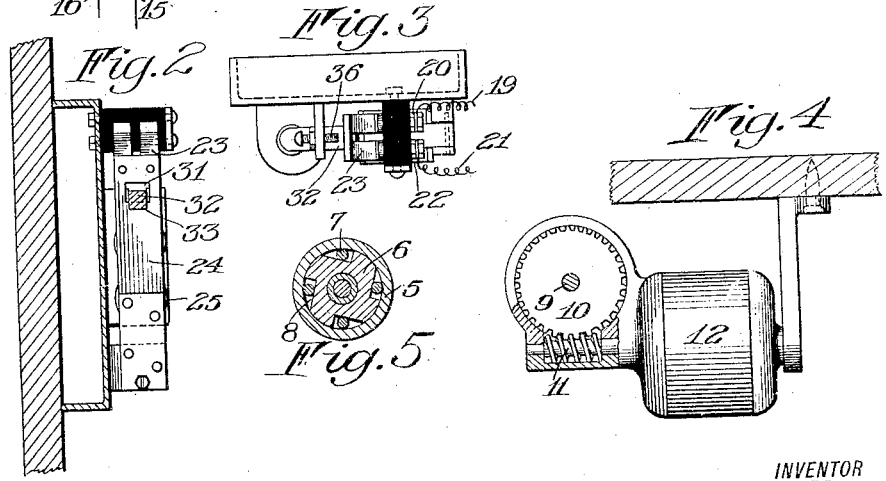
WITNESSES:
George D Powell
INVENTOR
James J. Phillips
BY
his ATTORNEYS J. J. PHILLIPS.
ELECTRIC WINDING MECHANISM FOR SPRING MOTORS.
APPLICATION FILED JUNE 2, 1917.
1,365,724.
Patented Jan. 18, 1921.
2 SHEETS—SHEET 2.
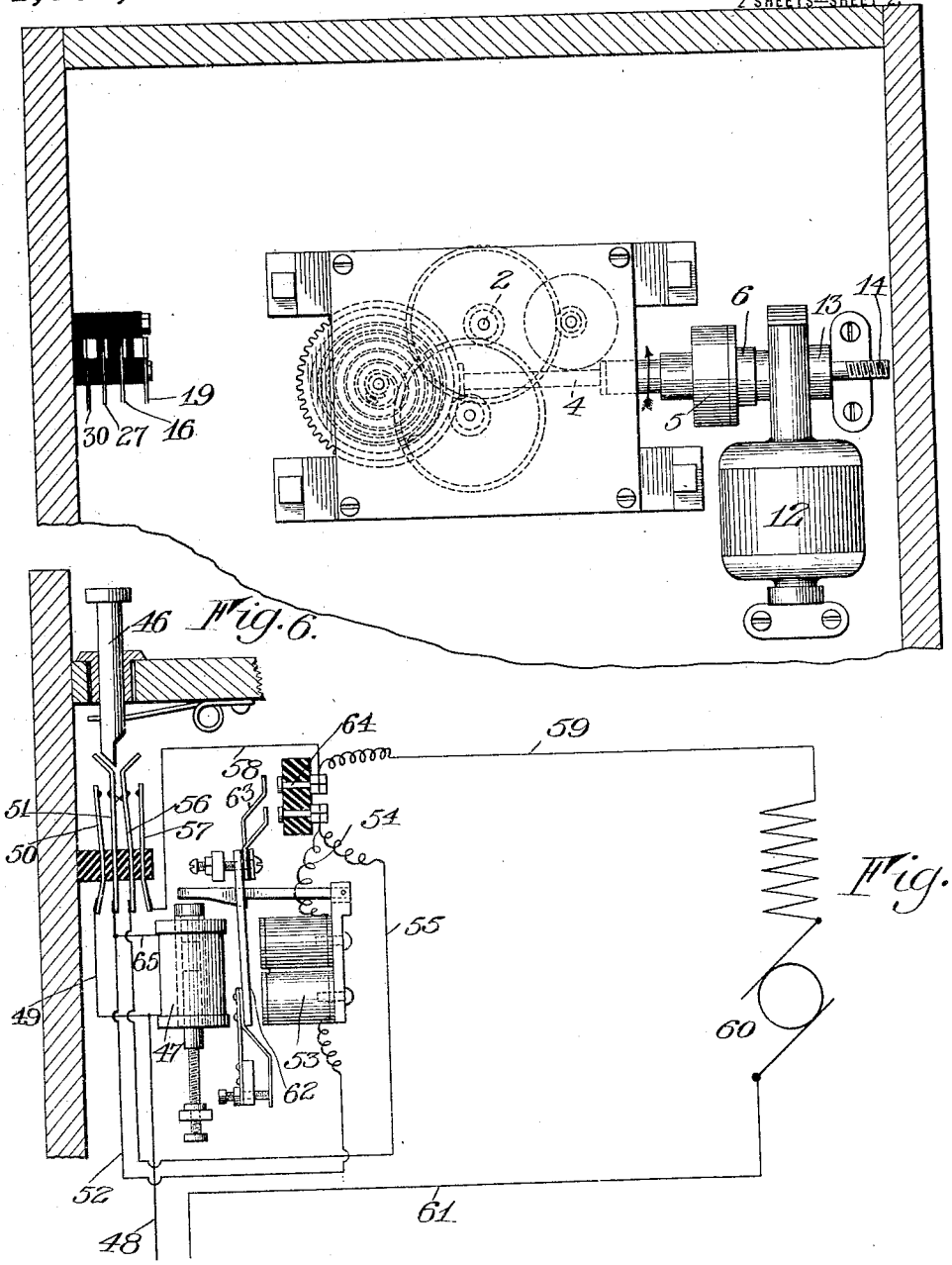
WITNESSES:
George W Powell
INVENTOR.
James J. Phillips
BY
his ATTORNEYS

UNITED STATES PATENT OFFICE.

JAMES J. PHILLIPS, OF ROCHESTER, NEW YORK, ASSIGNOR TO COLONIAL MULTIPHONE CORPORATION, OF ROCHESTER, NEW YORK, A CORPORATION OF NEW YORK.

ELECTRIC WINDING MECHANISM FOR SPRING-MOTORS.

1,365,724.      Specification of Letters Patent.      Patented Jan. 18, 1921.

Application filed June 2, 1917. Serial No. 172,518.

*To all whom it may concern:*

Be it known that I, JAMES J. PHILLIPS, of Rochester, in the county of Monroe and State of New York, have invented certain new and useful Improvements in Electric Winding Mechanism for Spring-Motors; and I do hereby declare the following to be a full, clear, and exact description of the same, reference being had to the accompanying drawings, forming a part of this specification, and to the reference-numerals marked thereon.

The invention relates to devices for automatically winding spring motors, and has to do more particularly with sound reproducing apparatus of the type where the record is operated through the instrumentality of a spring motor. More particularly the invention has for its object to provide means that enables a spring motor to be wound at any time, and automatically terminates the winding operation after an interval, when the motor has been wound sufficiently. A further purpose is to provide manually controlled means for starting the winding operation, and electrical devices operating automatically to discontinue the winding operation. An additional object of the improvement is to afford an effective apparatus which will be comparatively simple, readily operated and possible of manufacture and installation at a reasonable cost. To these and other ends the invention consists in certain improvements and combinations of parts, all as will be hereinafter more fully described, the novel features being pointed out in the claims at the end of the specification.

In the drawings:

Figure 1 is a sectional view of a sound reproducing machine with parts in elevation showing the application of my improvements as designed for alternating current control;

Fig. 2 is a sectional view on the line 2ª—2ª of Fig. 1;

Fig. 3 is a plan view of the parts shown in Fig. 2;

Fig. 4 is a detail view partly in side elevation and partly in section showing a portion of the drive from the electric motor to the spring motor;

Fig. 5 is a sectional view of a clutch forming part of the driving mechanism to the spring motor;

Fig. 6 is a bottom plan view of the parts, and

Fig. 7 is a side view, largely diagrammatic, illustrating the circuit arrangement for direct current control, the principle of operation being the same in both arrangements of Fig. 1 and Fig. 7.

Similar reference numerals in the several figures indicate the same parts.

In the illustrative embodiment of the invention, 1 designates the usual record table or support mounted upon the arbor 2 which is driven from the usual spring motor 3. The latter is wound from a shaft 4 which carries in fixed relation a clutch sleeve 5 arranged to be locked to a coöperating clutch member 6 through the rollers 7 and recesses 8. The clutch member 6 is mounted loosely upon a shaft 9, being carried by a collar on the loosely mounted worm wheel 10, driven by the worm 11 which in turn is mounted upon the motor shaft of the electric driving motor 12. The shaft 9 is secured in fixed relation with the shaft 4, and is carried beyond its supporting bearing 13, having a threaded end 14 to receive a handle by which the spring motor may be wound manually if for any reason the electrical controlling mechanism is out of commission. I will now describe the mechanism that controls the operation of the electric motor 12 and which forms the subject matter of my invention.

The structure comprises generally a motor circuit that is normally open and adapted to be closed through the instrumentality of a manual switch. The motor circuit is opened by solenoid-controlled means, and to this end includes a solenoid, governing the position of an automatic switch and operating to open said switch and stop the operation of the electric winding motor. As a subsidiary part of the improvement, I provide means acting automatically, whereby the solenoid is bridged, or is not made a part of the motor circuit until after the motor has been started initially. The purpose of this is to prevent subjecting the solenoid to the high current, created for an instant upon starting the motor, and which would create sufficient magnetism to move the core of the solenoid at once. By the arrangement which I will describe presently, the solenoid is not subjected to current until the motor has attained its normal speed or at least has passed beyond the initial stage of starting, and the operation of the motor then continues until the solenoid is energized sufficiently by the increased voltage, due to the resistance offered to the operation of the electric motor by the spring motor, to open the motor circuit.

With this brief description of the operation, the structure will be fully understood from a consideration of the details which include the main line conductors 15 and 16, which are fed from any suitable source of current supply, the arrangement which I am now describing being that of Fig. 1 and intended for alternating current. The conductor 15 leads directly to the motor 12 while conductor 16 leads to a contact 17 arranged for coöperation with another contact 18, and forming the solenoid-bridging circuit which will be presently more fully described. 19 is a conductor leading from the contact 18 to a switch terminal 20, while 21 is a conductor leading from the switch terminal 22 to the other side of the motor 12. 23 is an automatic switch which is supported upon a pivoted armature 24 that coöperates with an electromagnet 25 and operates to connect the switch terminals 20 and 22 to carry the current from conductor 19 to conductor 21 and the motor. The electromagnet 25 is connected with the main line through conductor 26, leading from conductor 15 to one side of the magnet, and conductor 27 leads from the other side of the magnet to a contact 28. The latter coöperates with a contact 29 from which conductor 30 leads to conductor 16. To afford locking means for holding the automatic switch closed, the armature 24 is provided with an opening or recess 31 through which extends a pivoted locking lever 32 having a shoulder 33 arranged to engage one face of the armature and lock it against movement away from the magnet 25, as shown in Figs. 1 and 2, after current is diverted from the electromagnet. The locking lever 32 assumes this position through gravity action, when the armature 24 is attracted by the magnet 25, and remains in locking position until it is kicked upwardly by the core 34 of solenoid 35. The core of the solenoid is located immediately under the outer end of the locking lever 32 and when moved upwardly by the action of the solenoid magnet, it releases the armature 24, permitting it to fall back to its normal position against an adjustable stop 36 and open the switch 23. The solenoid 35 is connected with conductor 16 by a conductor 38 and with conductor 19 by a conductor 39. 40 is an adjustable post or stop arranged in a bracket 41 and movable to determine the normal position of the solenoid core 34, and thus vary the interval of operation of the electric motor. 42 is a manually controlled push button or plunger held upwardly by a spring 43 and operable to set in motion the electric motor. The plunger 42 is provided with an inclined face 44 which initially engages the contact 17, and a second inclined face 45 located above the inclined face 44, and acting subsequently to engage the contact 28. With this arrangement it will be observed that when the plunger 42 is depressed, the circuit is initially closed between contacts 17 and 18 and subsequently closed between contacts 28 and 29. When the plunger is released and rises the reverse operation takes place, that is to say, the circuit is first broken between contacts 28 and 29 and finally broken between contacts 17 and 18, but the latter are held together until after contacts 28 and 29 are separated. The effect of this is to bridge the solenoid as the first of the series of operations, while opening the bridging circuit as the last of the series of operations, which does not take place until after the motor has been started. This will be more apparent from tracing the series of operations in the following manner.

Assuming the armature 24 to be released and that switch 23 is open, the plunger 42 is depressed, first closing the circuit between contacts 17 and 18 and immediately thereafter bringing contact 28 into engagement with contact 29. The instant this takes place, current passes from conductor 16 to conductor 30, contact 29, contact 28, conductor 27 to the electromagnet 25, thence through conductor 26 to conductor 15, or the other side of the line. This energizes electromagnet 25, pulling over the armature 24 and closing switch 23, as shown in Fig. 1, the armature being locked in this position by the lever 32. Current then passes from conductor 16 to contact 17, contact 18, conductor 19, switch 23, conductor 21 to the motor 12 and back through the conductor 15, putting the motor into operation. It will be observed that during this set of operations, which take place, upon pushing down the plunger 42, current does not pass through the solenoid 35, but when the plunger 42 is released and disengages the contact 17, the circuit is broken at that point and current thereafter passes from conductor 16 through conductor 38 to the solenoid, thence through conductor 39 to conductor 19 and over the path already traced. This operation continues until the current is sufficient to energize the magnet of solenoid 35 so as to move its core upwardly, thereby lifting the locking lever 32 and releasing the armature 24. This breaks the motor circuit at the switch 37 and stops the operation of the motor.

When employing direct current, the arrangement above described may be undesirable owing to the arc produced when the electromagnet 25 is cut out from the circuit, and for this reason I may employ the modified arrangement shown in Fig. 7, the operation of which is as follows: When the plunger 46 is depressed, the solenoid 47 is bridged as already described, and the current initially passes from conductor 48 to conductor 49, through contacts 50 and 51 to conductor 52 and electromagnet 53, thence to conductors 54 and 55, through contacts 56 and 57 to conductor 58, to conductor 59, to motor 60, and thence back to the other side of the line 61. Thus the current is initially supplied both to the electromagnet 53 and to the motor 60. Energization of the magnet 53 causes the armature 62 to be pulled over moving the switch blades 63 and closing the switch 64. When the plunger 46 is released the solenoid-bridging circuit is broken by the separation of contacts 50 and 51, and a circuit is completed between contacts 51 and 56, this being the normal position of the parts, as shown in Fig. 7, and the current then passes from conductor 48 directly to the solenoid 47, thence by conductor 65 to contact 51, contact 56, conductor 55, through switch 64, conductor 59, to the motor and back to the other side of the line, the operation continuing until the solenoid releases the locking lever holding the automatic switch, and opens the motor circuit in the manner already described. In Fig. 7, I have shown the automatic switch open and the locking lever in its upward position, this being the relative position of the parts after the motor circuit is opened, and just before a manual operation such as I have described.

It will be understood that by this application and disclosure, I do not purpose restricting the invention to any particular arrangement or details, but only to illustrate a possible embodiment as showing one manner in which the principle of the invention can be practically accomplished.

I claim as my invention:

1. In an electric spring-motor winding mechanism, the combination with an electric motor and motor circuit, of an automatic switch governing the motor circuit, an electromagnet acting to close said switch, locking means coöperating with the switch to hold it closed, a solenoid arranged to be included in the motor circuit and operating to release said locking means, and a switch controlling said electromagnet and connected with the said solenoid to shunt the latter while the motor is being started.

2. The combination with an electric spring-motor winding mechanism, including an electric motor and motor circuit, of an automatic switch governing the motor circuit, an electromagnet acting to close said switch, locking means coöperating with the switch to hold it closed, a solenoid arranged to be included in the motor circuit and operating to release said locking means, and a solenoid-bridging circuit around the solenoid whereby current is not supplied to it until after the motor is started.

3. In an electric spring-motor winding mechanism, the combination with an electric motor and motor circuit, of an automatic switch governing the motor circuit provided with means for locking it in closed position, an electromagnet acting to close said switch, a solenoid arranged to be included in the motor circuit and operating to release said locking means, a solenoid-bridging circuit, and a manual switch operating first to close the motor circuit and also energize said electromagnet and thereafter open the solenoid-bridging circuit and permit a supply of current to the solenoid.

4. In an electric spring-motor winding mechanism, the combination with an electric motor and motor circuit, of an automatic switch governing the motor circuit, an electromagnet acting to close said switch, locking means coöperating with the switch to hold it closed, a solenoid arranged to be included in the motor circuit and operating to release said locking means, a solenoid-bridging circuit, and a manual switch operating first to close the motor circuit and thereafter open the solenoid-bridging circuit and permit a supply of current to the solenoid.

5. The combination with an actuating motor of an electric motor for storing energy in said actuating motor, a circuit for said electric motor including an automatic switch, locking means for holding said switch in one position, an electromagnet for operating said switch, a solenoid in the motor circuit for releasing said locking means provided with a circuit for placing it in shunt with said motor circuit, and a switch for first closing said solenoid shunting circuit and energizing said electromagnet to close the motor circuit and for subsequently opening said shunting circuit to subject said solenoid to the motor circuit current.

6. The combination with an actuating motor, of an electric motor for storing energy in said actuating motor, a circuit for said electric motor including an automatic switch, locking means for holding said switch in one position, an electromagnet for operating said switch, a solenoid in the motor circuit for releasing said locking means and a second switch arranged to first energize said electromagnet to operate said automatic switch and start the motor and subsequently to disconnect said electromagnet and connect said solenoid in the motor circuit for operation by the increase in current when the actuating motor is fully stored with energy.

7. The combination of a spring motor, an electric motor for winding the same, having a circuit for the supply of electric current, an automatic switch in said motor circuit, an electromagnet controlling said switch, a solenoid in the motor circuit also controlling said switch, and a second switch having connections with said parts and movable successively to a plurality of positions for bridging said solenoid, energizing said electromagnet, deënergizing said electromagnet and unbridging said solenoid to permit the latter to be actuated by the increase of current in the motor circuit to actuate said automatic switch when said spring motor becomes wound.

JAMES J. PHILLIPS.